US012023909B1

(12) United States Patent
Rothenbuhler et al.

(10) Patent No.: US 12,023,909 B1
(45) Date of Patent: Jul. 2, 2024

(54) MEDIA GUIDE POSITION DETECTION

(71) Applicant: Hewlett-Packard Development Company, L.P., Spring, TX (US)

(72) Inventors: Dan Rothenbuhler, Boise, ID (US); Kenneth K. Smith, Boise, ID (US); Choon Siang Peck, Singapore (SG); Inn Chyun Goh, Singapore (SG); Aiqiang Yang, Singapore (SG); Jeffrey Nursalim, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/909,845

(22) PCT Filed: Mar. 20, 2020

(86) PCT No.: PCT/US2020/023837
§ 371 (c)(1),
(2) Date: Sep. 7, 2022

(87) PCT Pub. No.: WO2021/188113
PCT Pub. Date: Sep. 23, 2021

(51) Int. Cl.
*B41J 11/00* (2006.01)
*B41J 13/10* (2006.01)
*B65H 1/04* (2006.01)

(52) U.S. Cl.
CPC .......... *B41J 11/003* (2013.01); *B41J 11/0095* (2013.01); *B41J 13/103* (2013.01); *B65H 1/04* (2013.01); *B65H 2511/10* (2013.01); *B65H 2511/20* (2013.01)

(58) Field of Classification Search
CPC .... B41J 11/003; B41J 11/0095; B41J 13/103; B65H 2511/20
See application file for complete search history.

(56) References Cited

U.S. PATENT DOCUMENTS

| | | | |
|---|---|---|---|
| 5,940,106 | A | 8/1999 | Walker |
| 7,063,314 | B2 | 6/2006 | Eskey |
| 7,227,164 | B2 | 6/2007 | Sakai et al. |
| 7,375,832 | B2 | 5/2008 | Bouverie et al. |
| 7,584,950 | B2 | 9/2009 | Asada et al. |
| 8,439,344 | B2 | 5/2013 | Asada et al. |
| 9,219,836 | B2 | 12/2015 | Bouverie et al. |
| 9,481,186 | B2 | 11/2016 | Bouverie et al. |
| 9,931,867 | B1 | 4/2018 | Yap et al. |

(Continued)

FOREIGN PATENT DOCUMENTS

| | | | | |
|---|---|---|---|---|
| KR | 20060108292 | A | * 10/2006 | |
| TW | 202120416 | A | * 6/2021 | B65H 1/04 |

*Primary Examiner* — Sharon Polk
(74) *Attorney, Agent, or Firm* — Brooks, Cameron & Huebsch, PLLC

(57) ABSTRACT

A printing device includes an input tray in which sheets of media are loadable and a media guide movably adjustable along a dimension of the input tray and positionable against the sheets. The printing device includes a drive conductor electrically exposed parallel to the dimension of the input tray, detect conductors differently electrically exposed parallel to the dimension of the input tray, and a cross-conductor disposed on the media guide. The cross-conductor selectively electrically connects the drive conductor with the detect conductors according to a current media guide position to permit detection of the current media guide position.

15 Claims, 7 Drawing Sheets

(56) References Cited

U.S. PATENT DOCUMENTS

| | | | | |
|---|---|---|---|---|
| 9,975,356 | B2 | 5/2018 | Asada et al. | |
| 2005/0174413 | A1* | 8/2005 | Shen ........................ | B65H 1/04 347/104 |
| 2013/0341854 | A1* | 12/2013 | Miyakawa ............... | B65H 7/02 271/145 |

* cited by examiner

MEDIA GUIDE POSITION DETECTION

BACKGROUND

Printing devices, including standalone printers as well as all-in-one (AIO) devices that combine printing functionality with other functionality like scanning and copying, can form images on sheets of media such as paper. Printing devices can employ a variety of different printing technologies, including laser-printing and inkjet-printing technologies. Different sizes of media sheets having differing widths may be loaded into an input tray of a printing device for printing. Such different media sheet sizes include North American sizes such as letter, legal, tabloid, and ledger, as well as international paper sizes such as A0, A1, A2, A3, A4, A5, A6, A7, A8, and A9, among other sizes.

DETAILED DESCRIPTION

As noted in the background, different sizes of media sheets of differing widths may be loaded into an input tray of a printing device for printing. After loading media sheets of a given size into the input tray, the user may adjust media guides to either side of the sheets so that they abut the edges of the stack of sheets loaded into the tray. The printing device may be able to detect the width of the media sheets loaded into the device's input tray and correlate the detected width with media sheet size. The user may therefore not have to manually specify the size of the loaded media sheets. Further, for the printing device to be compliant with some types of printing protocol specifications, the device may have to provide media sheet size to an inquiring host computing device without the user manually indicating the size.

Adding media sheet width detection capability to a printing device can be costly and potentially decrease device reliability. For example, media sheet width detection techniques that employ mechanical switches may suffer from decreased reliability, as those switches may fail over time. Existing techniques that rely on optical or electrical approaches to detect the position of either or both guides as a way to detect sheet width may use a relatively large number of relatively expensive or complex components, rendering them cost prohibitive for less expensive printing devices.

Techniques described herein provide for media sheet width detection that ameliorate these and other issues. The described techniques detect the position of a media guide abutting the media sheets loaded into an input tray of a printing device to detect the width of the sheets. A drive conductor is electrically exposed parallel to the width of the input tray, and detect conductors are differently electrically exposed parallel to the tray's width. The drive and detect conductors may be part of a cable, such as a flexible (i.e., "flex") cable.

A cross-conductor is disposed on a media guide of the printing device, and selectively electrically connects the drive conductor with the detect conductors in accordance with the current position of the media guide. The current media guide position can be detected by sensing which detect conductors are electrically connected to the drive conductor. The width of the loaded media sheets and thus media sheet size may be discerned from the detected media guide position, as may whether the position of the media guide is an out of-range position. In an out-of-range position, the media guide has either not been adjusted properly (against the loaded media sheets) or the loaded media sheets are wider or narrower than what the printing device is capable of using. The described techniques can use a relatively small number of relatively inexpensive components, and may employ no mechanical components that are not already part of the printing device, such as the media guide.

Figure 1:
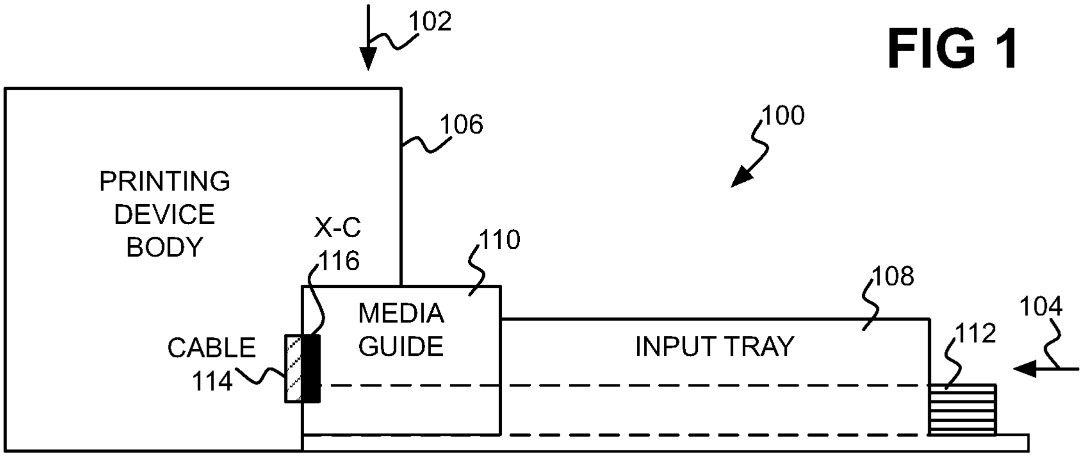
FIG. 1 is a side view diagram of an example printing device in which media guide position can be width-wise detected.

FIG. 1 shows a side view of an example printing device 100 in which media guide position is width-wise detected. The top of the printing device 100 is indicated by the arrow 102, and the front of the printing device 100 is indicated by the arrow 104. The printing device 100 may be a standalone printer or an all-in-one (AIO) printing device. The printing device 100 may a laser-printing device, an inkjet-printing device or another type of printing device. The printing device 100 includes a printing device body 106 into which an input tray 108 having a media guide 110 removably or irremovably extends.

Media sheets 112, such as paper, are loaded width-wise into the input tray 108. The printing device 100 individually advances the media sheets 112 from the input tray 108 through the printing device body 106, within which the device 100 forms images on the sheets 112. For instance, the media sheets 112 may be output at the back of the printing device 100, or onto an output tray (not shown) that also extends from the front of the printing device 100 above the input tray 108, or that is integrally formed on the top of the device 100.

The printing device 100 includes a cable 114, such as a flexible cable, disposed at the printing device body 106, and a cross-conductor 116 disposed at the media guide 110 opposite the cable 114. As depicted in the example of FIG. 1, the cross-conductor 116 is disposed at the back of the media guide 110. However, the cross-conductor 116 may instead be disposed at the top of the media guide 110 or at a different surface of the guide 110, in either of which case the cable 114 is disposed at the printing device body 106 so that the cable 114 remains opposite the cross-conductor 116.

Figure 2:
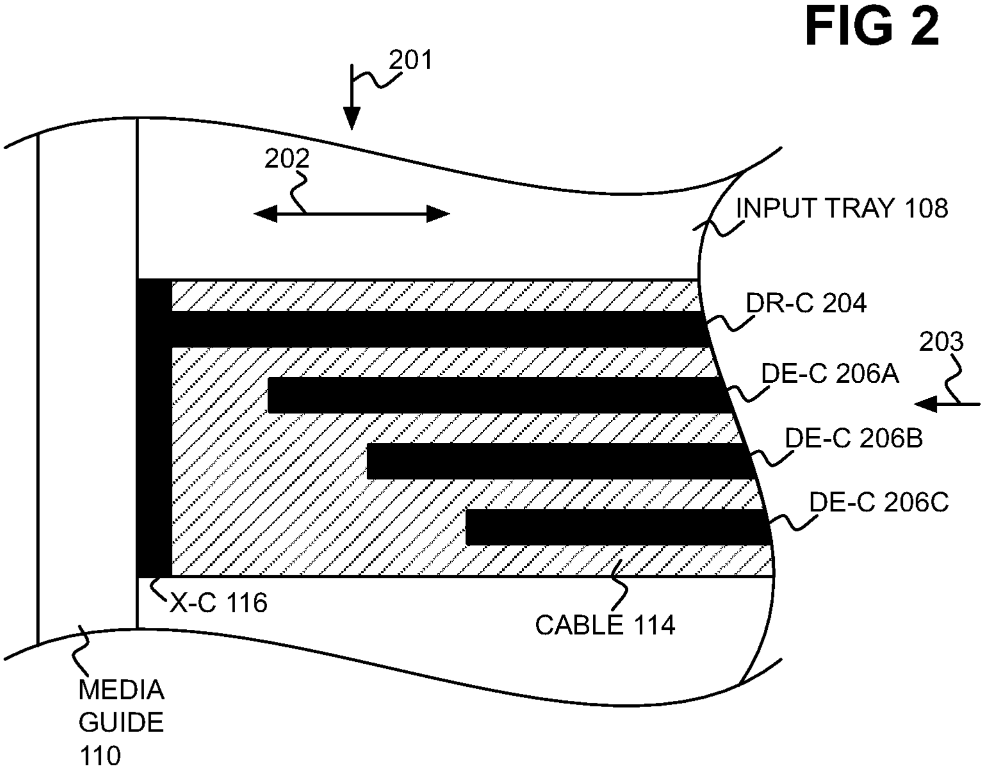
FIG. 2 is a front view diagram of an example technique for detecting media guide position within a printing device.

FIG. 2 shows an example technique for detecting media guide position. FIG. 2 specifically depicts the input tray 108, the media guide 110, the cable 114, and the cross-conductor 116 from the front of the printing device 100 as indicated by the arrow 104 in FIG. 1. The media guide 110 is a left media guide movably adjustable along the width of the input tray 108, as indicated by the arrow 202, so that the guide 110 can be positioned against the left edges of the media sheets 112 loaded in the tray 108 in FIG. 1.

There can be a corresponding right media guide that is similarly movably adjustable for positioning against the right edges of the media sheets 112. In such an implementation, the right media guide may be mechanically connected to move opposite the media guide 110, so that just the position of the left media guide has to be detected. In another implementation, both media guides may move independently of one another, and the position of the right media guide may be detected in the same manner as the media guide 110 is as is described herein.

The cable 114 includes a drive conductor ("DR-C") 204, and detect conductors ("DE-C") 206A, 206B, and 206C, which are collectively referred to as the detect conductors 206. The conductors 204 and 206 are electrically exposed parallel to the width of the input tray 108. The conductors 204 and 206 may be electrically exposed in that they may be conductively or capacitively exposed. In the example of FIG. 2, there are three detect conductors 206, but there may be as fewer or more such detect conductors 206.

The detect conductors 206 are each differently electrically exposed parallel to the width of the input tray 108. In the example of FIG. 2, the detect conductors 206 are electrically exposed in differing continuous lengths parallel to the width of the input tray 108. For instance, the detect conductors 206 may themselves be of different lengths.

As the media guide 110 is movably adjusted along the width of the input tray 108, the cross-conductor 116 disposed on the guide 110 differently electrically (e.g., conductively or capacitively) connects the drive conductor 204 with the detect conductors 206. Specifically, as the media guide 110 is movably adjusted from left to right, the cross-conductor 116 at first does not electrically connect the drive conductor with any detect conductor 206. As the media guide 110 continues to be moved to the right, the cross-conductor 116 electrically connects the drive conductor 204 with the detect conductor 206A.

Continuing to move the media guide 110 to the right results in the cross-conductor 116 electrically connecting the drive conductor 204 with the detect conductor 206B in addition to the detect conductor 206A. As such, the cross-conductor 116 electrically connects the drive conductor 204 with both the detect conductors 206A and 206B. Further movement of the media guide 110 to the right results in the cross-conductor 116 electrically connecting the drive conductor 104 with the detect conductor 206C, such that the cross-conductor 116 electrically connects the drive conductor 204 with all the detect conductors 206.

The cross-conductor 116 selectively electrically connecting the drive conductor 204 with the detect conductors 206 in accordance with the current position of the media guide 110 permits detection of the current media guide position. For instance, which of the detect conductors 206 are currently electrically connected to the drive conductor 204 via the cross-conductor 116 may be sensed. In the example of FIG. 2, the current media guide position may be detected as corresponding to the detect conductor 206 electrically connected to the drive conductor 204 that has the shortest electrically exposed length.

In the example of FIG. 2, four different positions of the media guide 110 can be detected. More generally, the number of media guide positions that can be detected using the detection technique of FIG. 2 is no greater than the number of detect conductors 206 plus one. For instance, a first media guide position corresponds to the drive conductor 204 electrically connected with none of the detect conductors 206 via the cross-conductor 116.

A second media guide position corresponds to the drive conductor 204 electrically connected with just the detect conductor 206A via the cross-conductor 116. A third guide position corresponds to the drive conductor 204 electrically connected with just the detect conductors 206A and 206B via the cross-conductor 116. A fourth position corresponds to the drive conductor 204 electrically connected with all the detect conductors 206 via the cross-conductor 116.

In the example of FIG. 2, the detect conductors 206 are differently electrically exposed to permit detection of uniformly spaced media guide positions. However, in another implementation, the detect conductors 206 may be differently electrically exposed to permit detection of differently spaced media guide positions. Some of the different media guide positions may correspond to different media sheet sizes, which can include sizes that have similar widths.

For example, A4 and letter media sheets are close in width. Therefore, a detect conductor 204 may be positioned along the width of the input tray 108 so that electrical connection between this detect conductor 206 and the drive conductor 204 ends or begins at a position to distinguish between media guide positions respectively corresponding to A4 and letter media sheets. More generally, the different media sheet sizes to be detected may be sequentially ordered by the width. For each rolling pair of media sheet sizes in this sequence, a detect conductor 206 can end or begin at a position along the width of the input tray 108 to distinguish between the corresponding pair of media guide positions.

Figure 3A:
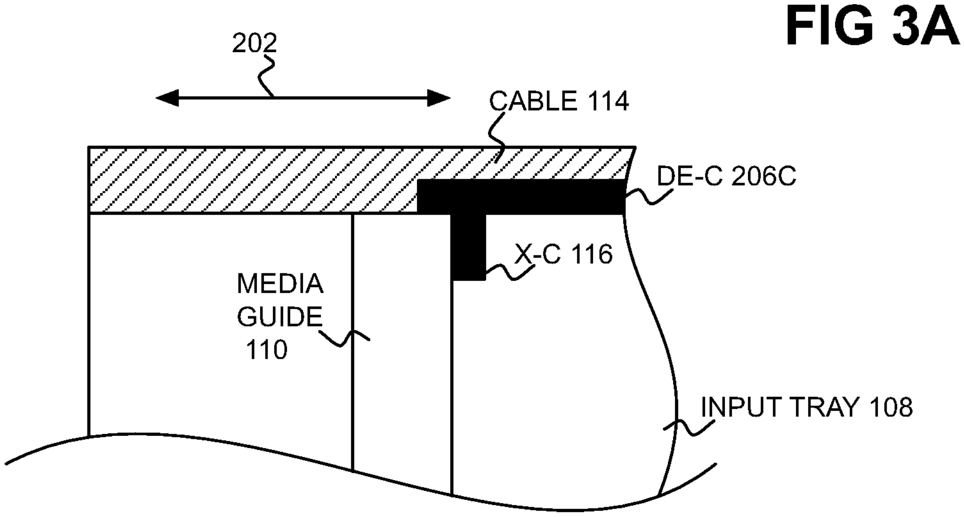
FIGS. 3A and 3B are top view and side view diagrams, respectively, of the example technique of FIG. 2 in an implementation using conductive connection sensing.
Figure 3B:
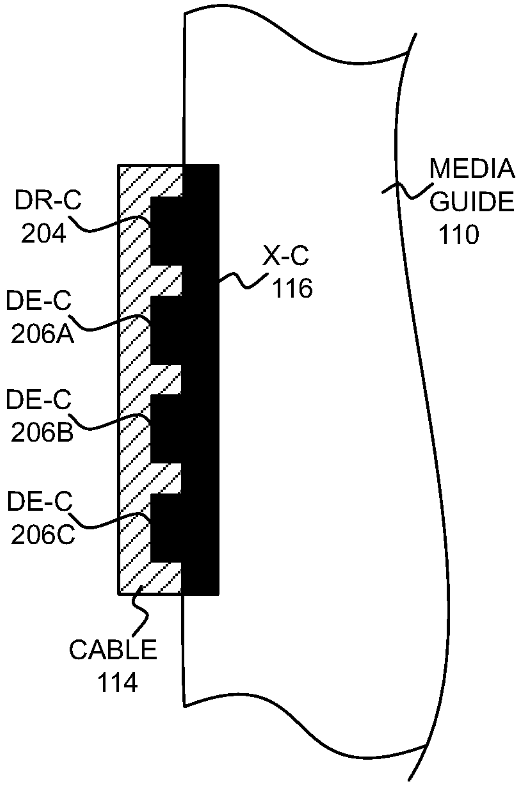

FIGS. 3A and 3B show the example media guide position detection technique of FIG. 2 in an implementation using conductive connection sensing. FIG. 3A specifically depicts the input tray 108, the media guide 110, the cable 114, and the cross-conductor 116 from the top as indicated by the arrow 201 in FIG. 2, with the media guide 110 movably adjustable along the width of the input tray 108 per the arrow 202. The detect conductor 206C of the cable 114 is specifically shown for example purposes. FIG. 3B specifically depicts the media guide 110, the cable 114, the cross-conductor 116, the drive conductor 204, and the detect conductors 206 from the side as indicated by the arrow 203 in FIG. 2, with the media guide 110 movably adjustable into and out of the plane of FIG. 3B.

In the implementation of FIGS. 3A and 3B, the cross-conductor 116 selectively conductively connects the drive conductor 204 with the detect conductors 206 according to the current position of the media guide 110 along the width of the input tray 108, as is specifically depicted with respect to the detect conductor 206C in FIG. 3A. The cross-conductor 116 is in physical and conductive contact with the detect conductor 206C in FIG. 3A, and thus selectively conductively connects the drive conductor 204 with the detect conductor 206C. The cross-conductor 116 selectively conductively connecting the drive conductor 204 with the detect conductors 206 in accordance with the current position of the media guide 110 in this manner permits detection of the current media guide position.

As one example, an external direct current (DC) power source or a DC power source that is part of a controller may be connected to the drive conductor 204, and external sensors or sensors that are part of the controller may be respectively connected to the detect conductors 206. The sensors thus sense whether current is flowing through their corresponding detect conductors 206. In this manner, which of the detect conductors 206 are currently conductively connected to the drive conductor 204 via the cross-conductor 116 can be sensed, so that the current media guide position can be detected.

Figure 4A:
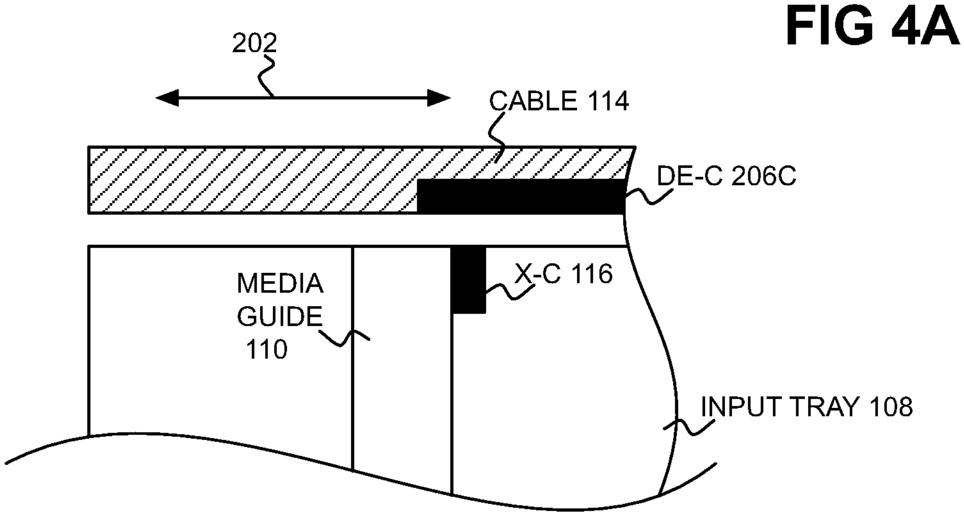
FIGS. 4A and 4B are top and side view diagrams, respectively, of the example technique of FIG. 2 in an implementation using capacitive connection sensing.
Figure 4B:
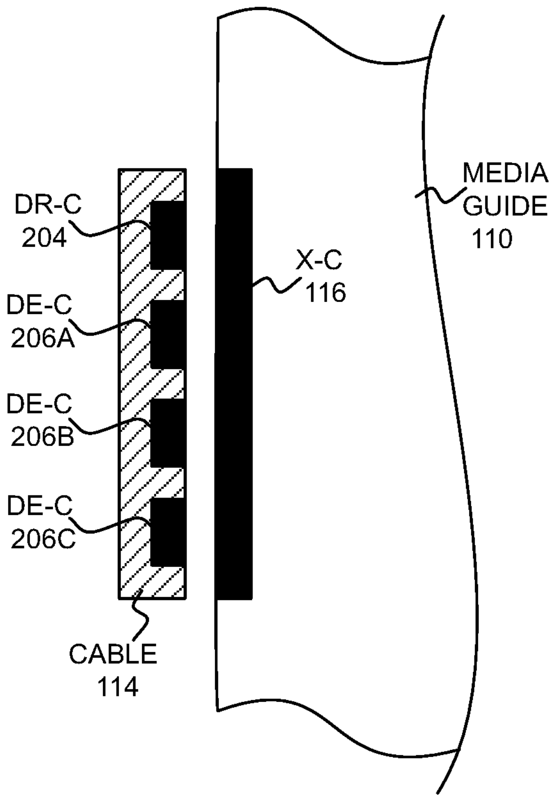

FIGS. 4A and 4B show the example media guide position detection technique of FIG. 2 in an implementation using capacitive connection sensing. FIG. 4A specifically depicts the input tray 108, the media guide 110, the cable 114, and the cross-conductor 116 from the top as indicated by the arrow 201 in FIG. 2, with the media guide 110 movably adjustable along the width of the input tray 108 per the arrow 202. The detect conductor 206C of the cable 114 is specifically shown for example purposes. FIG. 4B specifically depicts the media guide 110, the cable 114, the cross-conductor 116, the drive conductor 204, and the detect conductors 206 from the side as indicated by the arrow 203 in FIG. 2, with the media guide 110 movably adjustable into and out of the plane of FIG. 3B.

In the implementation of FIGS. 4A and 4B, the cross-conductor 116 capacitively connects the drive conductor 204 with the detect conductors 206 according to the current position of the media guide 110 along the width of the input tray 108, as is specifically depicted with respect to the detect conductor 206C in FIG. 4A. The cross-conductor 116 is not in physical contact with the detect conductor 206C; rather, there is a gap between the cross-conductor 116 and the cable 114. However, the cross-conductor 116 capacitively connects the drive conductor 204 with detect conductor 206C in FIG. 4A, with the gap acting as the dielectric of the capacitive connection between the conductors 204 and 206A. The cross-conductor 116 selectively capacitively connecting the drive conductor 204 with the detect conductors 206 according to the current position of the media guide 110 permits detection of the current media guide position.

For example, an external alternating current (AC) power source or an AC power source that is part of a controller may be connected to the drive conductor 204, and external sensors or sensors that are part of the controller may be respectively connected to the detect conductors 206. The AC power source may instead be an oscillating signal source. The sensors sense the capacitance between the drive conductor 204 and their respective detect conductors 206. In this manner, which of the detect conductors 206 are currently capacitively connected to the drive conductor 204 via the cross-conductor 116 can be sensed, so that the current media guide position can be detected. A detect conductor 206 may be considered as being capacitively connected to the drive conductor 204 via the cross-conductor 116 if the sensed capacitance between the detect conductor 206 and the drive conductor 204 is greater than a threshold.

Figure 5:
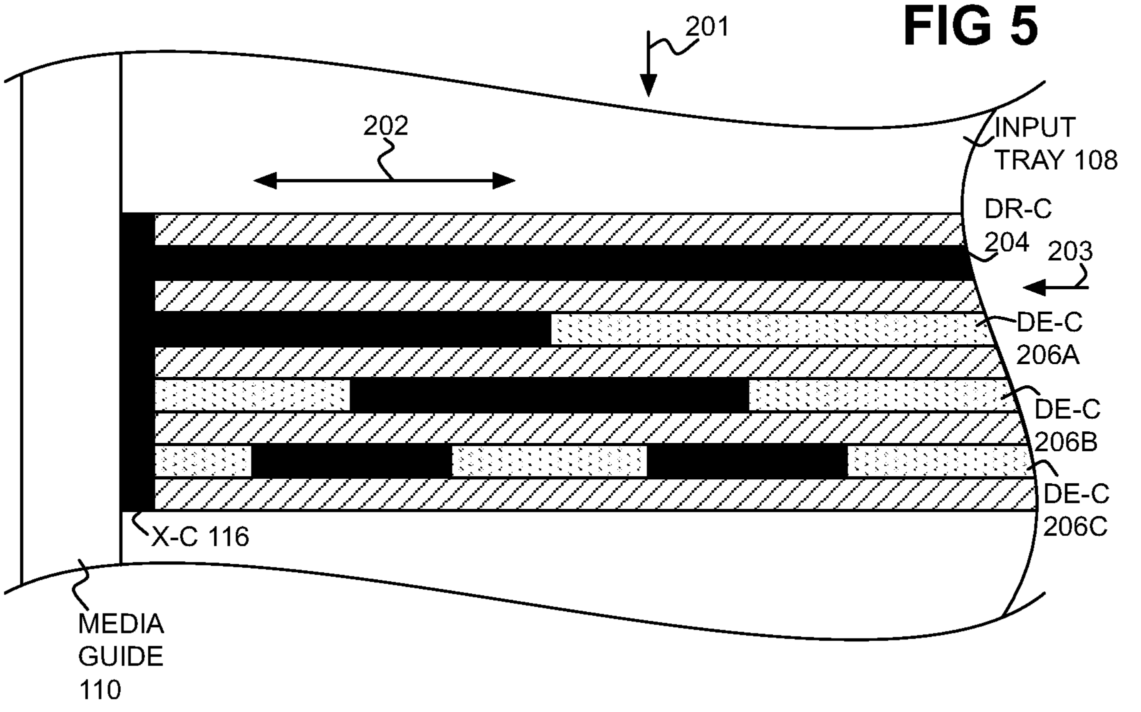
FIG. 5 is a front view diagram of another example technique for detecting media guide position within a printing device.

FIG. 5 shows another example technique for detecting media guide position, different than the technique of FIG. 2 having the conductive connection implementation of FIGS. 3A and 3B and the capacitive connection implementation of FIGS. 4A and 4B. Like FIG. 2, FIG. 5 depicts the input tray 108, the media guide 110, the cable 114, and the cross-conductor 116 from the front of the printing device 100 as indicated by the arrow 104 in FIG. 1. The media guide 110 is again a left media guide movably adjustable along the width of the input tray 108, as indicated by the arrow 202, so that the guide 110 can be positioned against the left edges of the media sheets 104 loaded in the tray 108 in FIG. 1. As before, there may also be a corresponding right media guide.

The cable 114 includes the drive conductor 204 and the detect conductors 206, as in FIG. 2. The conductors 204 and 206 are again electrically exposed parallel to the width of the input tray 108, such as in a conductive or capacitive manner, with the detect conductors 206 each differently electrically exposed parallel to the width of the input tray 108. As in the example of FIG. 2, there are three detect conductors 206 in the example of FIG. 5, but there may be as few as two detect conductors 206 or there may be more than three detect conductors 206.

The detect conductors 206 are differently electrically exposed parallel to the width of the input tray 108 in FIG. 5 in a different manner than in FIG. 2, however. Specifically, the detect conductors 206 are differently electrically exposed according to a binary encoding, such as a Gray encoding as is the case in FIG. 5. Such binary encoding permits the number of media guide positions that can be detected in FIG. 5 to be equal to two to the power of the number of detect conductors 206, as opposed to no greater than the number of detect conductors 206 plus one in FIG. 2.

For instance, as the media guide 110 is movably adjusted along the width of the input tray 108 in FIG. 5, the cross-conductor 116 first electrically connects electrical contact the drive conductor 204 with the detect conductor 206A. Electrical connection of the drive conductor 204 with just the detect conductor 206A corresponds to a first detectable position of the media guide 110.

Continuing to move the media guide 110 to the right results in the cross-conductor 116 also electrically connecting the drive conductor 204 with the detect conductor 206C. The cross-conductor 116 thus electrically connects the drive conductor 204 with both the detect conductors 206A and 206C. Electrical connection of the drive conductor 204 with just the detect conductors 206A and 206C corresponds to a second detectable position of the media guide 110.

Further movement of the media guide 110 to the right results in the cross-conductor 116 also electrically connecting the drive conductor 204 with the detect conductor 206B. The cross-conductor 116 thus electrically connects the drive conductor 204 with all the detect conductors 206. Electrical connection of the drive conductor 204 with all the detect conductors 206 corresponds to a third detectable position of the media guide 110.

Continuing to move the media guide 110 to the right results in the cross-conductor 116 no longer electrically connecting the drive conductor 204 with the detect conductor 206C. The cross-conductor 116 still electrically connects the drive conductor 204 with the detect conductors 206A and 206B. Electrical connection of the drive conductor 204 with just the detect conductors 206A and 206B corresponds to a fourth detectable position of the media guide 110.

Further movement of the media guide 110 to the right results in the cross-conductor 116 also no longer electrically connecting the drive conductor 204 with the detect conductor 206A. The cross-conductor 116 still electrically connects the drive conductor 204 with the detect conductor 206B. Electrical connection of the drive conductor 204 with just the detect conductor 206B corresponds to a fifth detectable position of the media guide 110.

Continuing to move the media guide 110 to the right results in the cross-conductor 116 again electrically connecting the drive conductor 204 with the detect conductor 206C. The cross-conductor 116 now electrically connects the drive conductor 204 with both the detect conductors 206B and 206C. Electrical connection of the drive conductor 204 with just the detect conductors 206B and 206C corresponds to a sixth detectable position of the media guide 110.

Further movement of the media guide 110 to the right results in the cross-conductor 116 no longer electrically connecting the drive conductor 204 with the detect conductor 206B. The cross-conductor 116 still electrically connects the drive conductor 204 with the detect conductor 206C. Electrical connection of the drive conductor 204 with just the detect conductor 206C corresponds to a seventh detectable position of the media guide 110.

Continuing to move the media guide 110 to the right results in the cross-conductor 116 again no longer electrically connecting the drive conductor 204 with the detect conductor 206C. The cross-conductor 116 now electrically connects the drive conductor 204 with none of the detect conductors 206. Electrical connection of the drive conductor 204 with none of the detect conductors 206 corresponds to an eighth detectable position of the media guide 110.

As in FIG. 2, the cross-conductor 116 selectively electrically connecting the drive conductor 204 with the detect conductors 206 in accordance with the current position of the media guide 110 permits detection of the current media guide position in FIG. 5. Which of the detect conductors 206 are currently electrically connected to the drive conductor 204 via the cross-conductor 116 may again be sensed. In the example of FIG. 5, the current media guide position may be detected as corresponding to an encoded binary value based on which detect conductors 206 are currently electrically connected with the drive conductor 204.

For instance, a detect conductor 206 electrically connected with the drive conductor 204 may correspond to a logic one, and the detect conductor 206 not electrically connected with the drive conductor 204 may correspond to a logic zero. The described first media guide position thus corresponds to an encoded binary value of 0×100, because just the detect conductor 206A is electrically connected with drive conductor 204 in this position. The second position corresponds to a binary value of 0×101, because just the detect conductors 206A and 206C are electrically connected with the drive conductor 204. The third position corresponds to an encoded binary value of 0×111, because all the detect conductors 206 are electrically connected with the drive conductor 204.

The fourth media guide position corresponds to a binary value of 0×110, because just the detect conductors 206A and 206B are electrically connected with the drive conductor 204. The fifth position corresponds to a binary value of 0×010, because just the detect conductor 206B is electrically connected with the drive conductor 204. The sixth position corresponds to a binary value of 0×011, because just the detect conductors 206B and 206C are electrically connected with the drive conductor 204. The seventh position corresponds to a binary value of 0×001, because just the detect conductor 206C is electrically connected with the drive conductor 204. The eighth position corresponds to a binary value of 0×000, because none of the detect conductors 206 are electrically connected with the drive conductor 204.

As in FIG. 2, in the example of FIG. 5, the detect conductors 206 are differently electrically exposed according to a binary encoding to permit detection of uniformly spaced media guide positions. However, in another implementation, the detect conductors 206 may be differently electrically exposed according to a binary encoding to permit detection of differently spaced media guide positions. Some of the different media guide positions may correspond to different media sheet sizes, which can include sizes that have similar widths.

For example, A4 and letter media sheets are close in width. Therefore, a detect conductor 204 may be positioned along the width of the input tray 108 so that electrical connection between this detect conductor 206 and the drive conductor 204 ends or begins at a position to distinguish between media guide positions respectively corresponding to A4 and letter media sheets. More generally, the different media sheet sizes to be detected may be sequentially ordered by the width. For each rolling pair of media sheet sizes in this sequence, a detect conductor 206 can end or being at a position along the width of the input tray 108 to distinguish between the corresponding pair of media guide positions.

Figure 6:
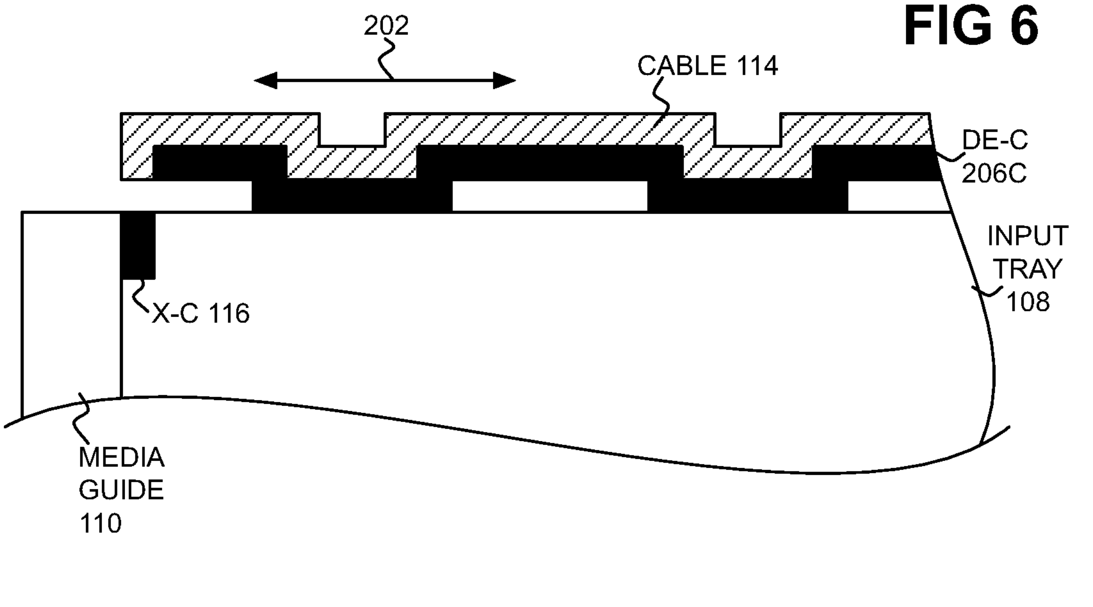
FIG. 6 is a top view diagram of the example technique of FIG. 5 in an implementation using conductive connection sensing.

FIG. 6 shows the example media guide position detection technique of FIG. 5 in an implementation using conductive connection sensing. FIG. 6 specifically depicts the input tray 108, the media guide 110, the cable 114, and the cross-conductor 116 from the top as indicated by the arrow 201 in FIG. 5, with the media guide 110 movably adjustable 110 along the width of the input tray 108 per the arrow 202. The detect conductor 206C of the cable 114 is specifically shown for example purposes. The side view corresponding to the top view of FIG. 6 is similar to FIG. 3B.

In the implementation of FIG. 6, the cross-conductor 116 conductively connects the drive conductor 204 with the detect conductors 206 according to the current position of the media guide 110 along the width of the input tray 108. The detect conductors 206 are differently bent away from the cross-conductor 116 according to the binary encoding, as is specifically depicted with respect to the detect conductor 206C. At positions of the media guide 110 at which the detect conductor 206C is bent away from the cross-conductor 116, the cross-conductor 116 is not in physical or conductive contact with the conductor 206C. At media guide positions at which the detect conductor 206C is not bent away from the cross-conductor 116, the cross-conductor 116 is in physical and conductive contact with the conductor 206C. In this way, the detect conductors 206 are thus conductively exposed according to the binary encoding.

The cross-conductor 116 thus selectively conductively connects the drive conductor 204 with the detect conductors 206 in accordance with the current position of the media guide 110, permitting detection of the current media guide position. For example, an external DC power source or a DC power source that is part of a controller may be connected to the drive conductor 204, and external sensors or sensors that are part of the controller may be respectively connected to the detect conductors 206. The sensors may sense whether current is flowing through their corresponding detect conductors 206. In this manner, which of the detect conductors 206 are currently conductively connected to the drive conductor 204 via the cross-conductor 116 can be sensed, so that the current media guide position can be detected.

Figure 7A:
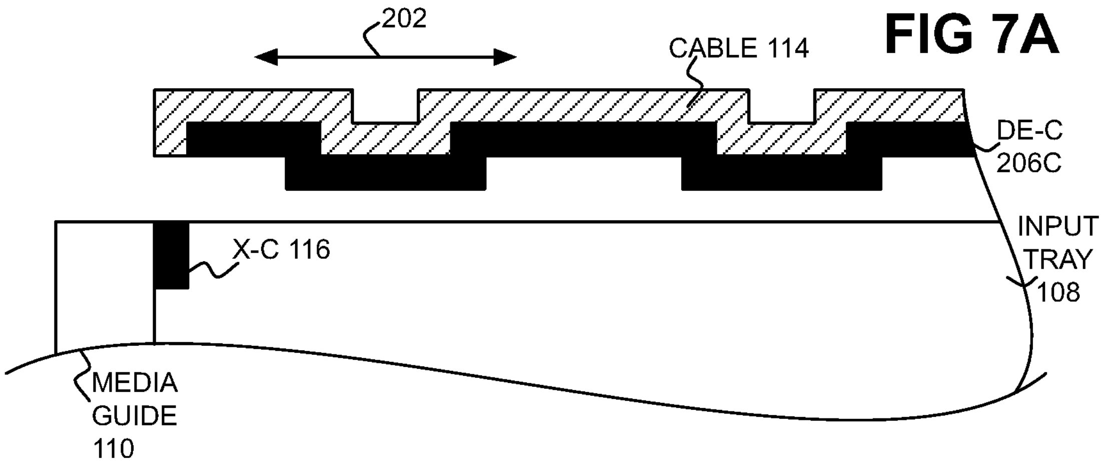
FIGS. 7A, 7B, and 7C are top view diagrams of the example technique of FIG. 5 in different implementations using capacitive connection sensing.
Figure 7B:
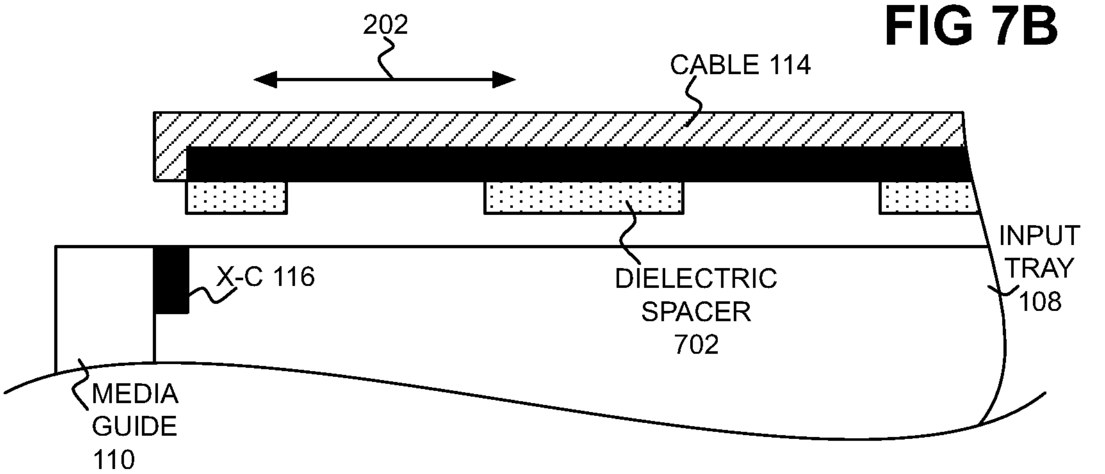
Figure 7C:
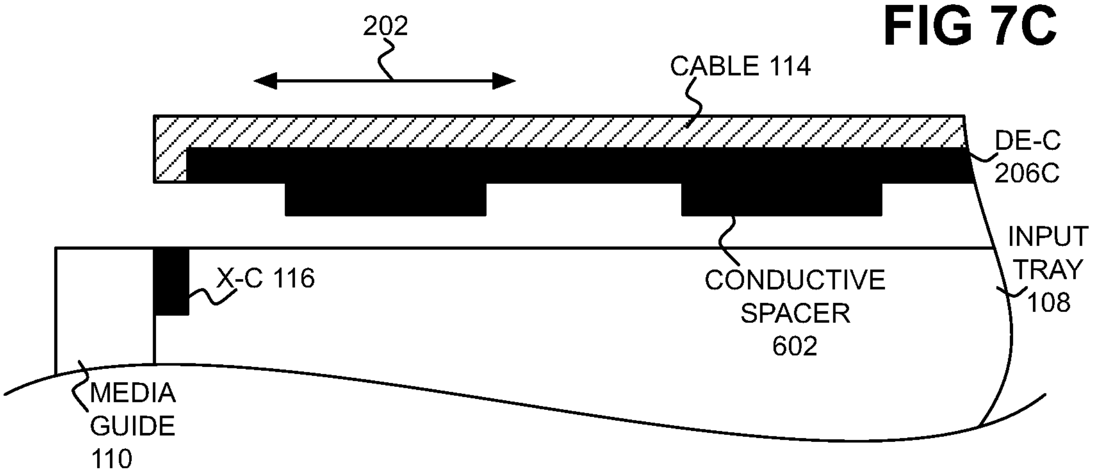

FIGS. 7A, 7B, and 7C show the example media guide position detection technique of FIG. 5 in different implementations using capacitive connection sensing. FIGS. 7A, 7B, and 7C specifically depict the input tray 108, the media guide 110, the cable 114, and the cross-conductor 116 from the top as indicated by the arrow 201 in FIG. 5, with the media guide 110 movably adjustable along the width of the input tray 108 per the arrow 202. The detect conductor 206C of the cable 114 is specifically shown for example purposes. The side view corresponding to the top view of each of FIGS. 7A, 7B, and 7C is similar to FIG. 4B.

In the implementations of FIGS. 7A, 7B, and 7C, the cross-conductor 116 selectively capacitively connects the drive conductor 204 with the detect conductors 206 according to the current media guide 110 along the width of the input tray 108, as is specifically depicted with respect to the detect conductor 206C. In the implementation of FIG. 7A, the detect conductors 206 are differently bent away from the cross-conductor 116 according to the binary encoding, as is specifically depicted with respect to the detect conductor 206C. The capacitance between the drive conductor 204 and the detect conductor 206C is therefore less at positions of the media guide 110 at which the conductor 206C is bent away from the cross-conductor 116 than at media guide positions at which the conductor 206 is not bent away from the cross-conductor 116.

In the implementation of FIG. 7B, dielectric insulative spacers 702 are differently positioned between the detect conductors 206 and the cross conductor 116 according to the binary encoding, as is specifically depicted with respect to the detect conductor 206C. While the spacers 702 are shown in FIG. 7B in physical contact with the detect conductors 206, in another implementation the spacers 702 may not be in physical contact with the conductors 206. The spacers 702 have a dielectric constant that is greater than the dielectric constant of the ambient atmosphere (e.g., air) at which no spacer 702 is present. The capacitance between the drive conductor 204 and the detect conductor 206C is therefore greater at positions of the media guide 110 at which a spacer 206 is present than at media guide positions at which a spacer 206 is absent.

In the implementation of FIG. 7C, the conductive spacers 602 are differently positioned between the detect conductors 206 and the cross conductor 116 according to the binary encoding, as is specifically depicted with respect to the detect conductor 206C. While the spacers 602 are shown in FIG. 7C in physical contact with the detect conductors 206, in another implementation the spacers 602 may not be in physical contact with the conductors 206. The capacitance between the drive conductor 204 and the detect conductor 206C is therefore greater at positions of the media guide 110 at which a spacer 206 is present than at media guide positions at which a spacer 206 is absent. In the implementations of FIGS. 7A, 7B, and 7C, the cross-conductor 116 selectively capacitively connecting the drive conductor 204 with the detect conductors 206 in accordance with the current position of the media guide 110 permits detection of the current media guide position.

For example, an external AC power source or an AC power source that is part of a controller may be connected to the drive conductor 204, and external sensors or sensors that are part of a controller may be respectively connected to the detect conductors 206. The AC power source may instead be an oscillating signal source. The sensors may sense the capacitance between the drive conductor 204 and their respective detect conductors 206. In this manner, which of the detect conductors 206 are currently capacitively connected to the drive conductor 204 via the cross-conductor 116 can be sensed, so that the current media guide position can be detected. A detect conductor 206 may be considered as being capacitively connected to the drive conductor 204 via the cross-conductor 116 if the sensed capacitance between the detect conductor 206 and the drive conductor 204 is greater than a threshold.

Figure 8:
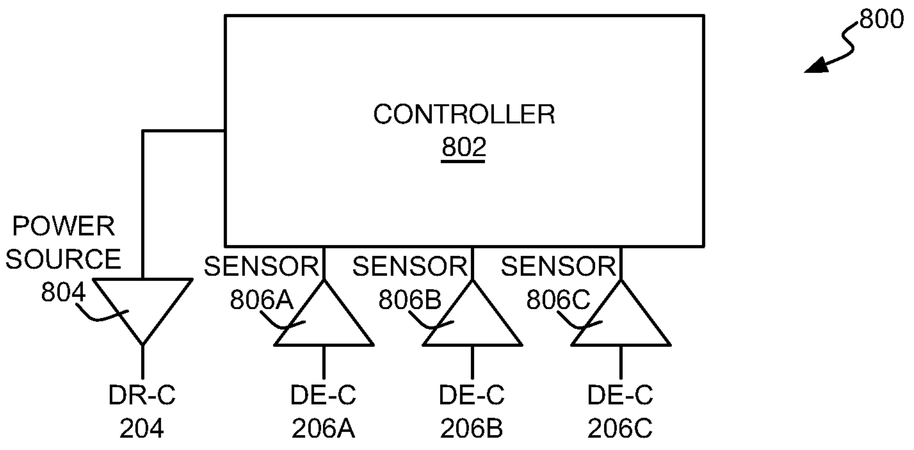
FIG. 8 is a diagram of example media guide position detection sub-assembly of a printing device.

FIG. 8 shows an example media guide position detection sub-assembly 800 of a printing device, such as the printing device 100 of FIG. 1. The sub-assembly 800 includes a controller 802, a power source 804, and sensors 806A, 806B, and 806C, which are collectively referred to as the sensors 806. In the example of FIG. 8, the power source 804 and the sensors 806 are external to the controller 802, but in another implementation the power source 804 and/or the sensors 806 may be part of the controller 802. The controller 802 may be an integrated circuit (IC), such as an application-specific IC (ASIC). The controller 802 is conductively connected to the power source 804, which is conductively connected to the drive conductor 204. The controller is conductively conducted to the sensors 806, which are respectively conductively connected to the detect conductors 206.

The controller 802 controls the power source 804 in applying power to the drive conductor 204. Each sensor 806 senses whether its corresponding detect conductor 206 is electrically connected with the drive conductor 204. The controller 802 can thus apply power to the drive conductor 204 by controlling the power source 804, and then detect the current media guide position based on which of the sensors 806 have sensed electrical connections between their corresponding detect conductors 206 and the drive conductor 204.

In a conductive connection implementation, such as that of FIGS. 3A and 3B and that of FIG. 6, the power source 804 may be a DC power source. Each sensor 806 may be a conductive sensor, like a current or voltage sensor, which senses a conductive connection of the drive conductor 204 with its corresponding detect conductor 206. In the implementation of FIGS. 3A and 3B, the controller 802 may detect the current media guide position as corresponding to the sensor 806 having a shortest different continuous length and that has sensed such conductive connection, has been described. In the implementation of FIG. 6, the controller 802 may detect the current media guide position as corresponding to a binary encoded value based on whether each sensor 806 has sensed such conductive connection, as has also been described.

In a capacitive connection implementation, such as that of FIGS. 4A and 4B and that of FIGS. 7A, 7B, or 7C, the power source 804 may be an AC power source or an oscillating signal source. Each sensor 806 may be a capacitive sensor that senses capacitive connection of the drive conductor 204 with its corresponding detect conductor 206, as has been described. In the implementation of FIGS. 4A and 4B, the controller 802 may detect the current media guide position as corresponding to the sensor 806 having a shortest different continuous length and that has sensed such capacitive connection, as has been described. In the implementation of FIGS. 7A, 7B, or 7C, the controller 802 may detect the current media guide position as corresponding to a binary encoded value based on whether each sensor 806 has sensed such a capacitive connection, as has also been described.

The techniques for detecting media guide position have thus far been described with respect to detecting the position of the media guide along the width of the input tray in which media sheets have been loaded. However, the position of a media guide that is adjustable along the length of the input tray, and that is also positionable against media sheets loaded in the tray, can be detected in a corresponding manner. In implementation, just the position of one of these two media guides may be detected, whereas in another implementation, the positions of both the media guides may be detected.

Figure 9:
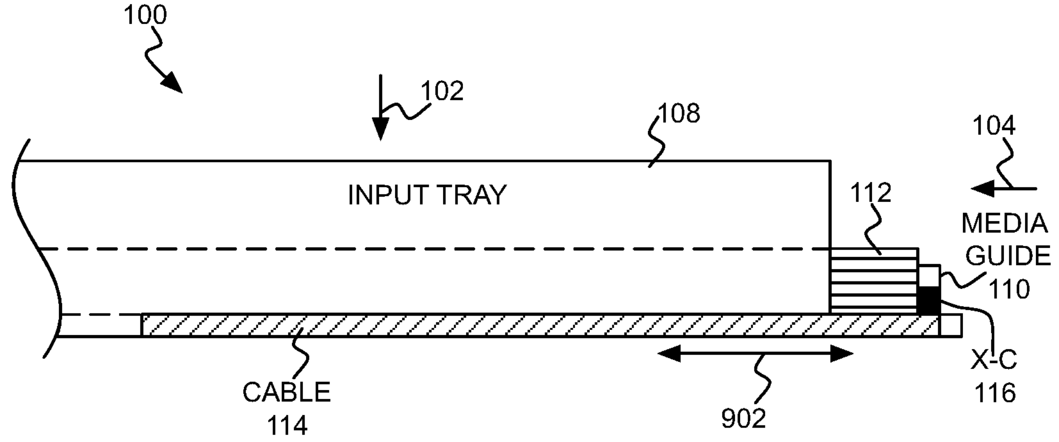
FIG. 9 is a side view diagram of a portion of an example printing device in which media guide position can be length-wise detected.

FIG. 9 shows a side view of a portion of the example printing device 100 in which media guide position is length-wise detected. The top of the printing device 100 is indicated by the arrow 102, and the front of the printing device 100 is indicated by the arrow 104, as in FIG. 1. Media sheets 112, also as in FIG. 1, are loaded in the input tray 108.

In the example of FIG. 9, however, the media guide 110 is movably adjustable along the length of the input tray 108, per arrow 902, so that the guide 110 can be positioned against the media sheets 112 along their length-wise edge instead of their width-wise edge as in FIG. 1. The cable 114 of the printing device 100 in this implementation is disposed at a bottom of the input tray 108. The cross-conductor 116 remains opposite the cross-conductor 116 in FIG. 9, however, and thus is disposed at the bottom of the media guide 110. Length-wise detection of media guide position is otherwise the same as has been described with respect to width-wise detection of media guide position.

Specifically, for length-wise media guide position detection, FIGS. 2, 5, 7A and 7B are from the perspective of the top of the printing device 100 (and rotated 180 degrees) as indicated by the arrow 102 of FIG. 9, instead of from the front of the device 100 as indicated by the arrow 104 as is the case for width-wise media guide position detection. FIGS. 3A, 4A, 6, 7A, 7B, and 7C are from the perspective of the side of the printing device 100 (and upside down) for length-wise media guide position detection. FIGS. 3B and 4B are from the perspective of the front of the device 100 (and rotated 90 degrees clockwise).

Figure 10:
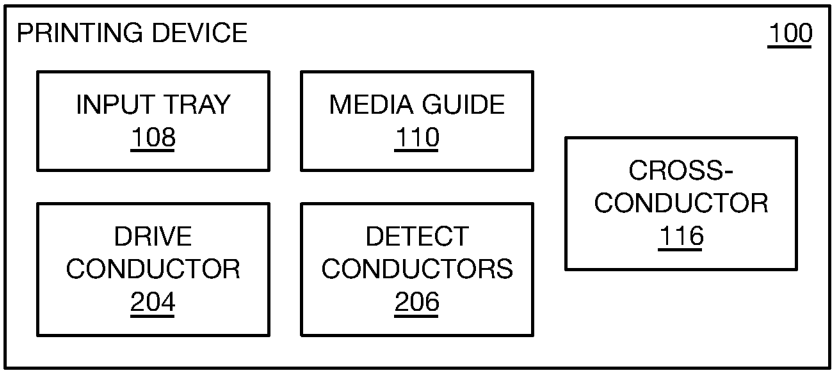
FIG. 10 is a block diagram of an example printing device.

FIG. 10 shows a block diagram of an example printing device 100. The printing device 100 includes an input tray 108 in which sheets of media can be loaded, and a media guide 110 movably adjustable along a dimension of the input tray 108 and positionable against the sheets. The dimension may be the width of the input tray 108 as in FIG. 1 or the length of the input tray 108 as in FIG. 9.

The printing device 100 includes a drive conductor 204 electrically exposed parallel to the width of the input tray, and detect conductors 206 differently electrically exposed parallel to the dimension of the input tray. The printing device includes a cross-conductor 116 disposed on the media guide 110. The cross-conductor 116 selectively electrically connects the drive conductor 204 with the detect conductors 206 according to the current position of the media guide 110 to permit detection of the current media guide position.

Figure 11:
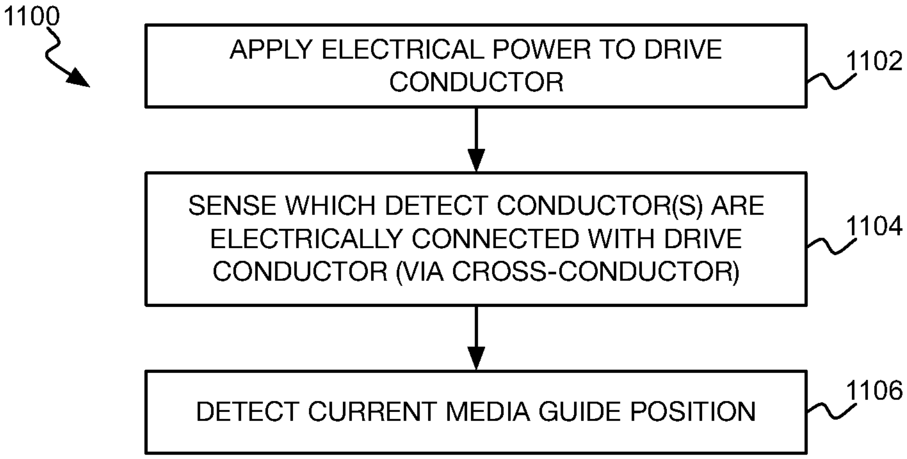
FIG. 11 is a flowchart of an example method.

FIG. 11 shows an example method 1100. The method includes applying electrical power to a drive conductor 204 electrically exposed parallel to a dimension of an input tray 108 of a printing device 100 (1102), such as the width or length of the input tray 108. Media sheets have been loaded in the input tray 108, and a media guide 110 movably adjustable along the dimension of the input tray has been positioned against the loaded media sheets.

In one implementation, electrical power may be applied to the drive conductor 204 just prior to when the printing device 100 is to start printing. In another implementation, electrical power may be applied to the drive conductor 204 when the printing device 100 is queried by a host computing device to determine the capabilities of the device 100, including the size of the media sheets loaded in the input tray 108.

The method 1100 includes sensing which detect conductors 206 differently electrically exposed parallel to the dimension of the input tray 108 are electrically connected with the drive conductor 204 by a cross-conductor 116 disposed on the media guide 110 (1104). The method 1000 includes detecting a current position of the media guide 110 based on which detect conductors 206 are so electrically connected with the drive conductor 204 by the cross-conductor 116 (1106).

The described techniques permit media guide position detection. The size of the media sheets can thus be detected in correspondence with the detected media guide position. Therefore, a user does not have to manually specify media sheet size, and a printing device can be compliant with printing protocols that specify the device has to provide media sheet size to an inquiring host computing device without the user manually indicating the size. In the described techniques, a cross-conductor on the media guide selectively connects a drive conductor with detect conductors based on the current position of the media guide.

We claim:

1. A printing device comprising:

an input tray in which sheets of media are loadable;

a media guide movably adjustable along a dimension of the input tray and positionable against the sheets;

a drive conductor electrically exposed parallel to the dimension of the input tray;

a plurality of detect conductors differently electrically exposed parallel to the dimension of the input tray; and a cross-conductor disposed on the media guide, the cross-conductor selectively electrically connecting the drive conductor with the detect conductors according to a current media guide position to permit detection of the current media guide position.

2. The printing device of claim 1, further comprising:

a controller to detect the current media guide position based on which of the detect conductors the cross-conductor has formed electrical connections with.

3. The printing device of claim 2, wherein each detect conductor is differently electrically exposed in a differing continuous length parallel to the dimension of the input tray, wherein the controller is to detect the current media guide position as corresponding to the detect conductor having a shortest different continuous length and with which the cross-conductor has formed an electrical connection.

4. The printing device of claim 3, wherein a number of different media guide positions detectable by the controller is no greater than a number of the detect conductors plus one.

5. The printing device of claim 2, wherein the cross-conductor selectively conductively connects the drive conductor with the detect conductors according to the current media guide position.

6. The printing device of claim 5, wherein the detect conductors are differently conductively exposed according to a binary encoding, wherein the controller is to detect the current media guide position as corresponding to a binary encoded value based on which of the detect conductors the cross-conductor has formed conductive connections with.

7. The printing device of claim 6, wherein a number of different media guide positions detectable by the controller is equal to two to the power of a number of the detect conductors.

8. The printing device of claim 6, wherein the binary encoding is a Gray encoding.

9. The printing device of claim 2, wherein the cross-conductor selectively capacitively connects the drive conductor with the detect conductors according to the current media guide position.

10. The printing device of claim 9, wherein the detect conductors are differently capacitively exposed according to a binary encoding, wherein the controller is to detect the current media guide position as corresponding to a binary encoded value based on which of the detect conductors the cross-conductor has formed capacitive connections with.

11. The printing device of claim 10, wherein the binary encoding is a Gray encoding.

12. The printing device of claim 10, wherein the detect conductors are bent away from the cross-conductor according to the binary encoding.

13. The printing device of claim 10, further comprising: conductive spacers differently positioned between the detect conductors and the cross-conductor according to the binary encoding.

14. The printing device of claim 10, further comprising: insulative spacers differently positioned between the detect conductors and the cross-conductor according to the binary encoding.

15. A method comprising:

applying electrical power to a drive conductor electrically exposed parallel to a dimension of an input tray of a printing device in which sheets of media have been loaded, and against which a media guide movably adjustable along the dimension of the input tray has been positioned;

sensing which of a plurality of detect conductors differently electrically exposed parallel to the dimension of the input tray are electrically connected with the drive conductor by a cross-conductor disposed on the media guide; and detecting a current media guide position based on which of the detect conductors are electrically connected with the drive conductor by the cross-conductor.

* * * * *